United States Patent
Yajima et al.

(10) Patent No.: US 10,486,878 B2
(45) Date of Patent: Nov. 26, 2019

(54) PACKAGE BAG AND METHOD FOR USING PACKAGE BAG

(71) Applicant: TAISEI LAMICK CO., LTD., Saitama (JP)

(72) Inventors: Akira Yajima, Saitama (JP); Mitsumasa Sekino, Saitama (JP)

(73) Assignee: TAISEI LAMICK CO., LTD., Saitama (JP)

(*) Notice: Subject to any disclaimer, the term of this patent is extended or adjusted under 35 U.S.C. 154(b) by 0 days.

(21) Appl. No.: 16/067,286

(22) PCT Filed: Feb. 14, 2017

(86) PCT No.: PCT/JP2017/005326
§ 371 (c)(1),
(2) Date: Jun. 29, 2018

(87) PCT Pub. No.: WO2017/154485
PCT Pub. Date: Sep. 14, 2017

(65) Prior Publication Data
US 2019/0001582 A1 Jan. 3, 2019

(30) Foreign Application Priority Data
Mar. 8, 2016 (JP) .................................. 2016-044203

(51) Int. Cl.
*B65D 75/20* (2006.01)
*B65D 75/30* (2006.01)
(Continued)

(52) U.S. Cl.
CPC ............. *B65D 75/20* (2013.01); *B65D 75/30* (2013.01); *B65D 75/5855* (2013.01);
(Continued)

(58) Field of Classification Search
CPC ........ B65D 31/02; B65D 31/12; B65D 75/30; B65D 75/5855; B65D 75/5866;
(Continued)

(56) References Cited

U.S. PATENT DOCUMENTS

RE24,251 E * 12/1956 Kaplan et al. ..... B65D 75/5811
222/107
4,890,744 A 1/1990 Lane, Jr. et al.
(Continued)

FOREIGN PATENT DOCUMENTS

JP 03-124581 5/1991
JP 07-132944 5/1995
(Continued)

OTHER PUBLICATIONS

Official Communication issued in PCT/JP2017/005326, dated Mar. 21, 2017.
(Continued)

*Primary Examiner* — Nicholas J. Weiss
(74) *Attorney, Agent, or Firm* — Greenblum & Bernstein, P.L.C.

(57) ABSTRACT

A package bag made by a packaging laminate film and provided midway between both side portions with a back-lined portion and a filling space of a liquid packing material, wherein the back-lined portion is sealed on its peripheral edge with an outer edge seal part, an inner edge seal part, an upper edge seal part and a lower edge seal part, while an internal side of these seal parts is defined by a partition wall of these seal parts into a self-supporting stable portion and a pouring path communicating to a pouring port disposed in the outer edge seal part; and the inner edge seal part is provided with a first easy-peelable portion separating the self-supporting stable portion and the filling space and a second easy-peelable portion separating the pouring path
(Continued)

and the filling space, and the first easy-peelable portion is preferentially peeled by pushing the filling space.

20 Claims, 4 Drawing Sheets

(51) Int. Cl.
    *B65D 77/38*     (2006.01)
    *B65D 75/58*     (2006.01)
    *B65D 77/10*     (2006.01)
    *B29L 31/00*     (2006.01)

(52) U.S. Cl.
    CPC ......... *B65D 75/5866* (2013.01); *B65D 77/10* (2013.01); *B65D 77/38* (2013.01); *B29L 2031/7128* (2013.01)

(58) Field of Classification Search
    CPC ........ B65D 77/10; B65D 77/38; B65D 81/32; B65D 81/3261; B65D 81/3266; B65D 85/72
    See application file for complete search history.

(56) References Cited

U.S. PATENT DOCUMENTS

| | | | | |
|---|---|---|---|---|
| 4,952,068 A | * | 8/1990 | Flint | ..................... B01F 5/0602 206/219 |
| 5,018,646 A | * | 5/1991 | Billman | ............. B65D 75/5822 222/107 |
| 5,131,760 A | | 7/1992 | Farmer | |
| 5,195,658 A | * | 3/1993 | Hoshino | ................ B65D 75/48 206/219 |
| 5,241,150 A | | 8/1993 | Garvey et al. | |
| 5,373,966 A | * | 12/1994 | O'Reilly | ................. B65B 9/023 206/484 |
| D505,861 S | * | 6/2005 | Risgalla | ........................ D9/696 |
| 7,658,542 B2 | * | 2/2010 | Risgalla | ............. B65D 75/5822 383/44 |
| 9,592,945 B2 | * | 3/2017 | Kogure | ............. B65D 75/5855 |
| 10,081,486 B2 | * | 9/2018 | Murray | ................... B65D 85/72 |
| 2005/0006404 A1 | * | 1/2005 | Harper | ................... B65D 75/30 222/107 |
| 2010/0051646 A1 | * | 3/2010 | Castillo | ............. B65D 75/5811 222/107 |
| 2015/0016757 A1 | | 1/2015 | Kogure | |
| 2017/0240330 A1 | * | 8/2017 | Bech | ................... B65D 75/008 |

FOREIGN PATENT DOCUMENTS

| | | |
|---|---|---|
| JP | 11-227796 | 8/1999 |
| JP | 2013-169991 | 9/2013 |
| JP | 5731423 | 6/2015 |
| WO | 2016/002817 | 1/2016 |

OTHER PUBLICATIONS

Decision to Grant a Patent in Japan counterpart Appl. No. 2016-044203 dated Apr. 5, 2017, along with English language translation thereof.

Notification of Reasons for Refusal in Japan counterpart Appl. No. 2016-044203 dated Mar. 15, 2017, along with English language translation thereof.

* cited by examiner (a)

(b)

(a)

(b)

PACKAGE BAG AND METHOD FOR USING PACKAGE BAG

TECHNICAL FIELD

This invention relates to a package bag for filling and packaging a liquid packing material such as liquid, viscous material or the like and a method for using the same, and more particularly to a package bag capable of simply opening by pushing with fingers or the like but also controlling a pouring direction of the liquid packing material and a method for using the same.

RELATED ART

Products formed by filling and packaging a liquid or viscous packing material such as foods and drinks, cosmetics, medicines, solvents and so on into a package bag made from a plastic film are widely sold since early times. In many package bags, a tearing guide flaw or fine flaw such as— notch, V notch or the like as shown in Patent Document 1 is provided on a portion jointed by heat sealing or the like for defining a filling space of the packing material and an opening procedure can be performed by tearing the joint portion of the package bag from the flaw position through nipping with fingers until at least arrival in the filling space of the packing material.

In the conventional opening method, however, there are problems that the tearing is difficult in children, old man or the like having a weak nipping force, and the liquid packing material is poured into an unintended place due to the fact that the tearing cannot be performed in a given direction accurately. To this end, the applicant have previously proposed a package bag provided on its back-lined joint portion with a narrow-width pouring path and an easy-peelable portion disposed on the pouring path in Patent Document 2. In this package bag, the thickness of the package bag is made to about 2 times by outward-folding into two parts at the back-lined joint portion provided with the pouring path as a border and the filling space of the liquid packing material is pushed into a thickness direction at such a state, whereby the easy-peelable portion disposed in the pouring path can be opened under an action of a small pushing force through the liquid packing material and hence the pouring of the liquid packing material from the package bag can be performed simply irrespective of age and sex.

PRIOR ART DOCUMENTS

Patent Documents

Patent Document 1: JP-1107-132944
Patent Document 2: Japanese Patent No. 5731423

SUMMARY OF THE INVENTION

Task to be Solved by the Invention

In the package bag of Patent Document 2, the easy-peelable portion can be opened simply by folding into two parts at the back-lined joint portion as a border to push the filling space of the liquid packing material. However, if the package bag is made from a thin packaging laminate film having a low stiffness strength, the back-lined joint portion is bent or the back-lined joint portion is oscillated by a pouring pressure in the opening of the easy-peelable portion and hence there is a possibility that the pouring port cannot be directed into an intended direction and the liquid packing material is poured into an unexpected place to cause contamination therearound.

And also, such a package bag is constructed so as to pour the liquid packing material from the pouring port at the same time of opening the easy-peelable portion, so that the pouring quantity in the opening cannot be adjusted by a pushing force with the fingers and hence a great amount of the liquid packing material is poured unintendedly.

It is, therefore, an object of the invention to provide a package bag wherein a pouring direction and a pouring amount of the liquid packing material from a pouring port can be easily controlled in a package bag provided on its back-lined joint portion with the pouring port.

Solution for Task

The invention is developed for achieving the above object and is a package bag made by a packaging laminate film and provided midway between both side portions with a back-lined portion formed by superposing both side portions of the packaging laminate film to each other and a filling space of a liquid packing material divided by seal parts at least disposed in a bottom portion and a top portion thereof, characterized in that the back-lined portion is sealed on its peripheral edge with an outer edge seal part, an inner edge seal part, an upper edge seal part and a lower edge seal part, while an internal side of these seal parts is defined by a partition wall made of a seal part into a self-supporting stable portion and a pouring path communicating to a pouring port disposed in the outer edge seal part; and the self-supporting stable portion and the pouring path are adjacent to the filling space through the inner edge seal part, and a first easy-peelable portion separating the self-supporting stable portion and the filling space and a second easy-peelable portion separating the pouring path and the filling space are provided in the inner edge seal part, and the first easy-peelable portion is preferentially peeled by pushing the filling space as compared to the second easy-peelable portion.

In the package bag according to the invention, the followings are more preferable solving means:

(1) at least a part of the first easy-peelable portion is located at a central portion of the inner edge seal part;
(2) a length of the first easy-peelable portion is longer than that of the second easy-peelable portion;
(3) the self-supporting stable portion is enclosed by the first easy-peelable portion and the partition wall;
(4) the partition wall is extended between the outer edge seal part and the inner edge seal part and connected thereto;
(5) the pouring path is located in a central part of the back-lined portion, while the self-supporting stable portion is located on both sides of the pouring path through the partition wall, and a joining strength of the second easy-peelable portion is higher than a joining strength of the first easy-peelable portion;
(6) the partition wall is provided on at least a part thereof with an easy-peelable portion;
(7) the pouring path is gradually narrowed toward the pouring port;
(8) both side portions of the package bag are folded portions of the packaging laminate film;
(9) the pouring path has an island-shaped seal portion for adjusting a path width; and
(10) the pouring port is sealed on its inner faces at an easy-peelable state.

Further, the invention is concerned with a method for using the above package bag, characterized in that the first easy-peelable portion is peeled by a first pushing to the filling space filled with the liquid packing material to fill the liquid packing material poured through the first easy-peelable portion into the self-supporting stable portion, and then the second easy-peelable portion is peeled by a second pushing to the filling space and the liquid packing material in the self-supporting stable portion and the filling space is guided to the pouring path and poured from the pouring port located at a top thereof.

In the use method of the package bag, it is a more preferable solving means that the first and second pushing to the filling space are performed by pushing to a thickness direction of the filling space at a state of outward-folding the package bag into two parts at the back-lined portion as a border.

Effect of the Invention

In the package bag according to the invention, the back-lined portion located midway between both side portions of the package bag and sealed on its peripheral edge with the outer edge seal part, inner edge seal part, upper edge seal part and lower edge seal part is independently divided into the self-supporting stable portion and the pouring path by the partition wall of a sealing portion inside these seal parts, while the self-supporting stable portion and the pouring path are adjacent to the filling space of the liquid packing material through the inner edge seal part and the inner edge seal part is provided with the first easy-peelable portion separating the self-supporting stable portion and the filling space and the second easy-peelable portion separating the pouring path and the filling space, and the first easy-peelable portion is preferentially peeled and opened by pushing to the filling space as compared to the second easy-peelable portion.

Thus, when the pressure by the liquid packing material is acted to the inner edged seal part by pushing the filling space of the liquid packing material with fingers or the like at a state of folding into two parts, for example, in the back-lined portion as a border (hereinafter called as "first pushing"), the first easy-peelable portion is first peeled at the position of the self-supporting stable portion and the liquid packing material in the filling space is flowed through the easy-peelable portion toward the inside of the self-supporting stable portion associated therewith.

Next, when the pressure through the liquid packing material is acted to the inner edge seal part by further pushing the filling space (hereinafter called as "second pushing") at a state of filling the liquid packing material in the self-supporting stable portion inside the back-lined portion, the second easy-peelable portion is gradually peeled at a position of the pouring path and the liquid packing material in the filling space is slowly guided through the peel portion into the pouring path and poured from the pouring port located at a top thereof.

According to the invention, therefore, the liquid packing material is filled in the self-supporting stable portion at the back-lined portion by the first pushing, while the liquid packing material is poured from the pouring port by the second pushing at such a state, so that the back-lined portion is rendered into a vertically standing posture in the pouring of the liquid packing material and the bending becomes hardly, whereby the directionality of the package bag improves and the liquid packing material can be poured into a target position accurately.

In the invention, the self-supporting stable portion flowing the liquid packing material by peeling of the first easy-peelable portion and the pouring path communicating to the pouring port are independent to each other through the partition wall, so that there is no fear of pouring the liquid packing material from the pouring port at the same time of opening the first easy-peelable portion.

In the package bag according to the invention, a step of pouring the liquid packing material from the filling space to the back-lined portion is separated from a step of pouring the liquid packing material from the pouring port, so that there is no fear of pouring a great amount of the liquid packing material unintendedly in the opening of the package bag and further the pouring amount of the liquid packing material can be controlled simply by adjusting the pushing force with the fingers.

In the invention, it is preferable that at least a part of the first easy-peelable portion is located in a middle portion of the inner edge seal part, or the self-supporting stable portion is located in a middle portion of the back-lined portion. In this case, the upper portion and lower portion of the inner edge seal part are constrained by the upper edge seal part and lower edge seal part of the back-lined portion, so that the degree of freedom in an opening (peeling) direction is low, while the central portion is high in the degree of freedom and is most peelable because the constraining force by the upper edge seal part and lower edge seal part is not acted. Therefore, when the pressure of the liquid packing material based on the first pushing to the filling space is acted to the inner edge seal part, a part of the first easy-peelable portion located in the central portion of the inner edge seal part is opened preferentially, whereby the liquid packing material can be first flowed into the self-supporting stable portion.

In the invention, the length of the first easy-peelable portion is preferable to be longer than the length of the second easy-peelable portion. In this case, the first easy-peelable portion is first peeled by the pressure of the liquid packing material based on the first pushing to the filling space, whereby the liquid packing material can be first flowed into the self-supporting stable portion. Also, procedure from the peeling of the first easy-peelable portion to the peeling of the second easy-peelable portion becomes smooth, so that the second easy-peelable portion can be peeled till the last by a small pushing force even if the width is narrow.

In the invention, the self-supporting stable portion is preferable to be enclosed by the first easy-peelable portion and the partition wall. In this case, when the liquid packing material is filled in the self-supporting stable portion by peeling the first easy-peelable portion as mentioned above, the rising property of the back-lined portion can be increased to improve the pouring directionality of the liquid packing material.

In the invention, even when the pouring path is located in a side portion of the upper edge seal part and/or a side portion of the lower edge seal part and the self-supporting stable portion is disposed so as to locate in a central part of the back-lined portion, the first easy-peelable portion can be peeled preferentially likewise the above case. Also, the back-lined portion is sterically changed associated with the filling of the liquid packing material into the self-supporting stable portion to form an upright posture to the filling space, whereby the liquid packing material can be poured to a target position accurately.

On the other hand, when the pouring path is located in the central part of the back-lined portion and the self-supporting stable portion is located in both sides of the pouring path through the partition wall, the joining strength of the second easy-peelable portion separating the pouring path and the filling space is made higher than the joining strength of the first easy-peelable portion separating the self-supporting stable portion and the filling space. Moreover, the word "joining strength" in the invention means a force required for opening the easy-peelable portion. The joining strength of the first and second easy-peelable portions can be controlled by varying the sealing conditions (heating temperature, applied pressure and so on) to adjust a sealing strength or by adjusting a sealing width. Thus, when the pressure of the liquid packing material based on the first pushing is applied to the inner edge seal part of the back-lined portion, the first easy-peelable portion having a weak joining strength is peeled preferentially and the liquid packing material can be flowed into the self-supporting stable portion associated with the peeling of the first easy-peelable portion. Also, the peeling of the second easy-peelable portion can be prevented at the same time of the peeling the first easy-peelable portion.

In the invention, at least a part of the partition wall separating the self-supporting stable portion and the pouring path is preferable to be an easy-peelable portion. For example, when a boundary portion to the inner edge seal part is an easy-peelable portion, the boundary portion of the partition wall to the inner edge seal part is peeled together with the second easy-peelable portion in the movement of peeling from the first easy-peelable portion to the second easy-peelable portion, so that there is no fear that the partition wall blocks the procedure of the peeling and hence the procedure of the peeling to the second easy-peelable portion becomes smooth and the second easy-peelable portion can be peeled simply by a propagation force based on the peeling of the first easy-peelable portion. Therefore, even if the width of the pouring path is narrow, the second easy-peelable portion can be peeled simply.

When the pouring path is gradually made narrow toward the pouring port, the liquid packing material can be flowed along the pouring path toward a top thereof, so that the pouring direction of the liquid packing material from the pouring port can be controlled easily to suppress the occurrence of liquid dropping.

Further, when the both side portions of the package bag are made from a folded portion of the packaging laminate film, if the package bag is folded outward into two parts in the back-lined portion as a border at a state of filling the liquid packing material into the filling space, the thickness of the package bag is approximately 2 times of the thickness at a flat state, and the easy-peelable portion can be peeled simply under an action of a small pushing force to the filling space.

In the invention, it is preferable to arrange an island-shaped seal portion for adjusting the path width in the pouring path. Thus, when the liquid packing material is flowed into the pouring path by the second pushing, excessive jumping of the liquid packing material from the pouring port can be prevented. Also, the size of the path width adjusting seal portion is adjusted in accordance with the kind and viscosity of the liquid packing material and so on to change the path width of the pouring path, whereby the pouring amount of the liquid packing material can be controlled.

In the invention, the pouring port located at a top of the pouring path is preferable to be sealed by easy-peelable sealing mutual inner faces thereof through a heat sealing or the like. In this case, penetration of dust and fog into the pouring path is not caused till the use start of the package bag, and hence hygienic property can be improved.

EMBODIMENTS FOR CARRYING OUT THE INVENTION

An embodiment of the invention will be described with reference to the drawings below.

Figure 1:
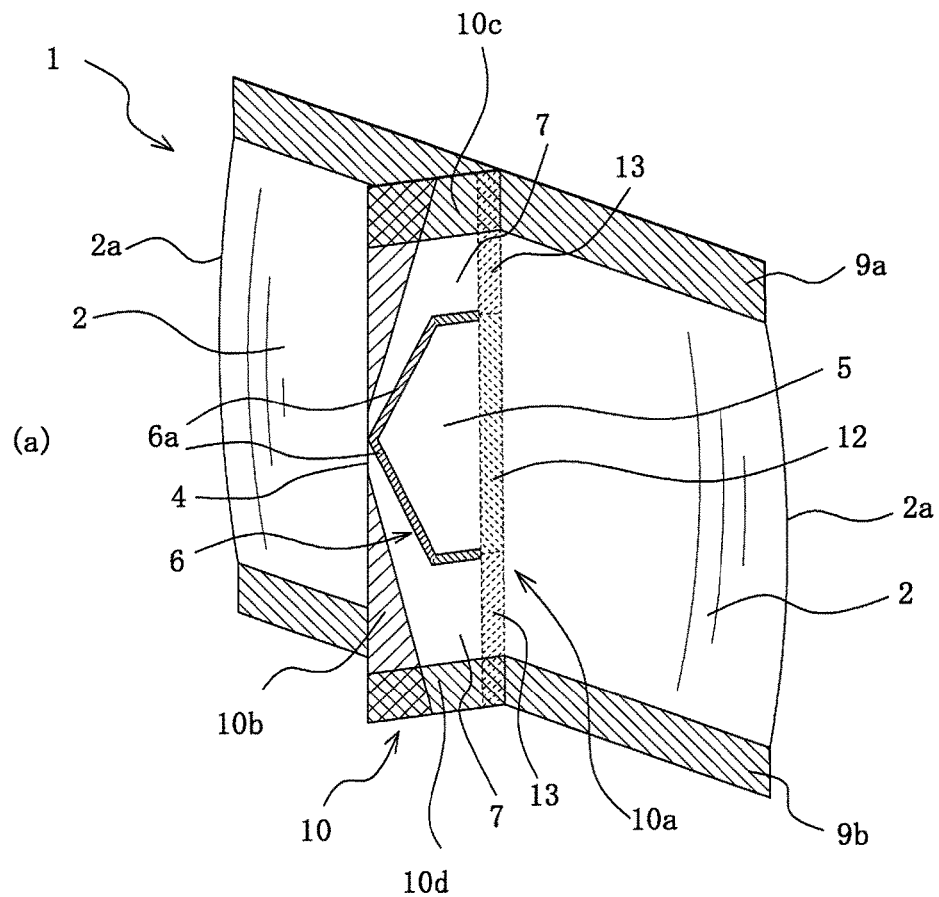
FIG. 1 shows an embodiment of the package bag according to the invention, wherein (a) is a perspective view and (b) is a plane view showing a state of outward-folding the package bag of (a) into two parts at a back-lined portion as a border.

In the embodiment shown in FIG. 1, a package bag 1 comprises a back-lined portion 10 formed by folding a packaging laminate film of a lamination structure having a two or more layers with a sealant layer so as to render the sealant layer into an inner face and superposing both side portions thereof to each other, and a filling space 2 for a liquid packing material enclosed by the back-lined portion 10, a top seal part 9a and a bottom seal part 9b formed through heat sealing, impulse sealing, high frequency welder sealing, ultrasonic sealing or others as shown by diagonal lines in the figure.

In the package bag 1 of FIG. 1, the both side portions are made from a folded portion 2a of the packaging laminate film but are not limited thereto. They are enough to have the back-lined portion 10 and may be various kinds of package bags such as a four-sealing type package bag formed by sealing the both side portions and the like.

Here, the back-lined portion 10 is located in a middle between the both side portions of the package bag 1 and the peripheral edged portion thereof is sealed by an inner edge seal part 10a, an outer edge seal part 10b, an upper edge seal part 10c and a lower edge seal part 10d. A portion inside these seal parts 10a-10d is defined into a self-supporting stable portion 5 and a pouring path 7 by a partition wall 6 of a seal portion formed by subjecting front and rear packaging laminate films to heat sealing or the like. Now, the upper edge seal part 10c is located in a top of the package bag 1 and the lower edge seal part 10d is located in a bottom thereof.

The inner edge seal part 10a located in a boundary between the filling space 2 and the back-lined portion 10 is constructed with a first easy-peelable portion 12 separating the self-supporting stable portion 5 and the filling space 2 and a second easy-peelable portion 13 separating the pouring path 7 and the filling space 2. Moreover, the first easy-peelable portion 12 and the second easy-peelable portion 13 are formed separately as shown in this figure, but may be integrally united with each other. When the first easy-peelable portion 12 and the second easy-peelable portion 13 are formed separately, the joining strengths of these portions may be varied.

The first easy-peelable portion 12 and the second easy-peelable portion 13 are portions having a relatively low joining strength as compared to the seal parts 10a-10d located on the peripheral edge of the back-lined portion 10, which can be formed, for example, by making at least one of a heating temperature and an applied pressure relatively small to conduct heat sealing or the like. Also, the first easy-peelable portion 12 and the second easy-peelable portion 13 are preferable to have such a joining strength (for example, see breaking strength in Patent Document 2) that they are not peeled or broken even by pushing the filling space 2 when the bag is stored or transported at a flat posture while filling and packaging the liquid packing material in the filling space 2, but can be peeled when the package bag 1 is folded outward into two parts at the back-lined portion 10 as a border and the filling space 2 is pushed in a thickness direction.

In the package bag 1, the self-supporting stable portion 5 is located in a central part of the back-lined portion 10 in the longitudinal direction and enclosed by the first easy-peelable portion 12 and the partition wall 6. Also, the pouring path 7 is disposed so as to enclose the self-supporting stable portion 5 and the width thereof is gradually narrowed toward a pouring port 4 disposed in the outer edge seal part 10d.

Thus, the first easy-peelable portion 12 is preferable to be located in a central portion of the inner edge seal part 10a. In this case, the first easy-peelable portion 12 can be peeled simply under an action of a small pushing force to open the package bag 1 because when the pressure of the liquid packing material is applied to the inner edge seal part 10a by pushing the filling space 2 for pouring the liquid packing material as mentioned later, since the upper portion and lower portion of the inner edge seal part 10a are constrained by the top seal part 9a and the bottom seal part 9b of the package bag 1, the degree of freedom in an opening (peeling) direction is low, while the central portion is high in the degree of freedom since the constraining force is not acted and is most easily peeled.

Figure 2:
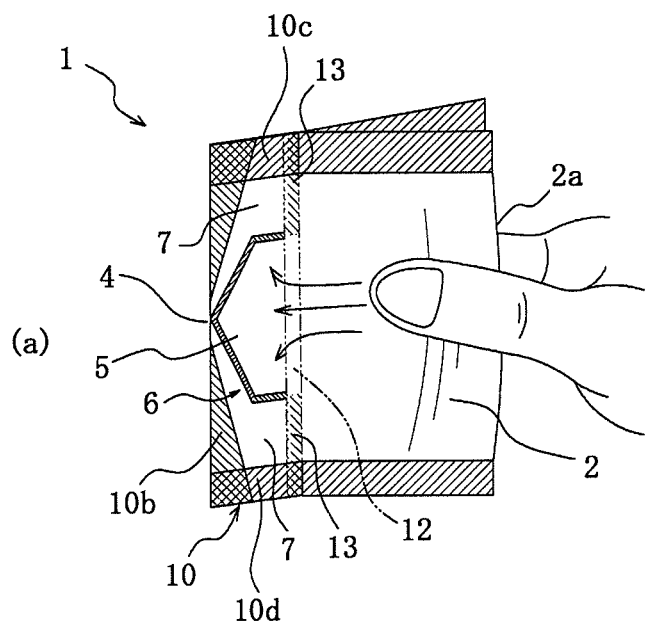
FIG. 2 shows a procedure of pouring a liquid packing material from the package bag of FIG. 1, wherein (a) is a view showing a state of peeling an easy-peelable portion by a first pushing to a filling space and (b) is a view showing a state of introducing a liquid packing material into a pouring port by a second pushing to a filling space.
Figure 2:
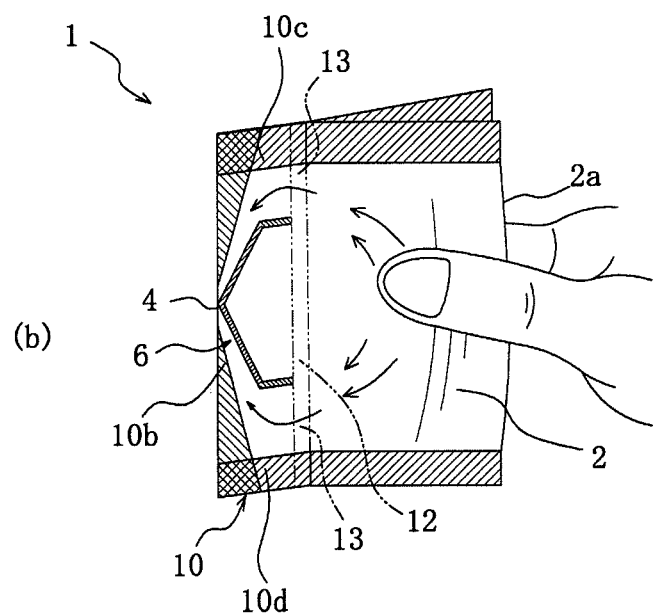

In the package bag 1 having such a construction, when the bag is folded outward into two parts at the back-lined portion as a border as shown in FIG. 1(b) and the filling spaces 2 are pushed in a direction of approaching to each other as shown by an arrow in this figure (first pushing), a peeling force based on the pressure of the liquid packing material in the filling space 2 acts to the inner edge seal part 10a as shown in FIG. 2(a) and hence the peeling is started in the first easy-peelable portion 12 located in the central portion of the inner edge seal part 10a.

Moreover, when the both side portions of the package bag 1 are made from the folded portion 2a of the packaging laminate film as shown in FIG. 1, the thickness of the package bag 1 in the outward-folding of the package bag 1 at the border of the back-lined portion 10 as shown in FIG. 1(b) is about 2 times of a thickness at a flat state, and the first easy-peelable portion 12 can be peeled simply under an action of a small pushing force to the filling space 2.

When the length of the first easy-peelable portion 12 in the longitudinal direction is made longer than the length of the second easy-peelable portion 13, the first easy-peelable portion 12 can be peeled more easily prior to the second easy-peelable portion 13 without peeling the second easy-peelable portion 13. Also, when the second easy-peelable portion 13 is peeled after the peeling of the first easy-peelable portion 12 by further pushing the filling space 2 as mentioned later, the procedure of the peeling becomes smooth and hence the second easy-peelable portion 13 can be peeled under a small pushing force.

At this moment, the first easy-peelable portion 12 is peeled at the peeling start position so as to be broken by the peeling force of the liquid packing material, and therefore the liquid packing material is poured from the filling space 2 through the peeled portion to the self-supporting stable portion 5. With regard to the pouring pressure of the liquid packing material, the thickness of the filling space 2 is decreased due to the flowing the liquid packing material into the self-supporting stable portion 5, and hence the pushing force can be reduced.

Since the self-supporting stable portion 5 and the pouring path 7 are separated completely by the partition wall 6, the liquid packing material cannot be directly flown into the pouring port 4 associated with the peeling of the first easy-peelable portion 12, so that there is no fear that the liquid packing material is unintentionally poured from the pouring port 4 or scattered from the pouring port 4 to contaminate environment.

The self-supporting stable portion 5 is swollen by flowing the liquid packing material from the filling space 2 and rendered into a sterically self-stood state. When the filling space 2 is further pushed under the self-stood state as shown in FIG. 2(b) (second pushing), the second easy-peelable portion 13 separating the pouring path 7 and the filling space 2 is gradually peeled under the aforementioned state of reducing the pushing force of the filling space 2 and the liquid packing material inside the filling space 2 is slowly introduced into the pouring port 4, whereby the liquid packing material is gently poured from the pouring port 4. Further, the back-lined portion 10 is kept at a vertically standing state to filling space 2 based on the self-supportability of the self-supporting stable portion 5 in the pouring of the liquid packing material without swinging, whereby the pouring directionality can be improved and the liquid packing material can be accurately poured into a target place.

In the package bag 1 according to the invention, a step of opening the package bag 1 (first pushing) and a step of pouring the liquid packing material from the pouring port 4 (second pushing) are separate as mentioned above, so that there is no fear that a great amount of the liquid packing material is poured unintentionally in the opening of the package bag 1, and further the pouring rate of the liquid packing material can be controlled simply by adjusting the pushing force with fingers.

Since the pouring path 7 is formed so as to gradually make narrow toward the pouring port 4, the liquid packing material flown into the pouring path 7 is flowed into the pouring port 4 along an inclination face (partition wall 6) of the inclined pouring path 7, so that there can be expected an effect of easily controlling the pouring amount, pouring pressure and pouring direction of the liquid packing material.

Moreover, at least a part of the partition wall 6 is preferable to be an easy-peelable portion. For example, when the boundary position to the inner edge seal part 10a is an easy-peelable portion, the easy-peelable portion of the partition wall 6 is peeled together with the second easy-peelable portion without blocking the peeling of the second easy-peelable portion and the movement from the peeling of the first easy-peelable portion 12 to the peeling of the second easy-peelable portion 13 is performed smoothly, and hence the peeling can be performed under a small pushing force even in the second easy-peelable portion 13 having a low degree of freedom in the opening (peeling) direction as mentioned above.

For example, when an angle shape side portion 6a of the partition wall 6 at the side of the pouring port 4 is an easy-peelable portion, this side portion 6a is peeled together with the second easy-peelable portion 13 by the second pushing and hence the liquid packing material stored in the self-supporting stable portion 5 can be poured from such a peeled portion without retaining therein.

Also, the pouring port 4 is preferable to be sealed at a state capable of easily peeling in the front and rear packaging laminate films. In this case, the package bag 1 can be kept at a closed state till the start of use, so that penetration of liquid substance, dust, fog and so on from the pouring port 4 can be suppressed to improve hygiene. Moreover, a joining strength of the easy-peelable portion disposed in the pouring port 4 is enough to be a strength capable of simply performing the peeling by the pressure of the liquid packing material and smoothly pouring the liquid packing material from the pouring port 4 and is preferably not more than 15 N/width of 15 mm, more preferably not more than 10 N/width of 15 mm.

Figure 3:
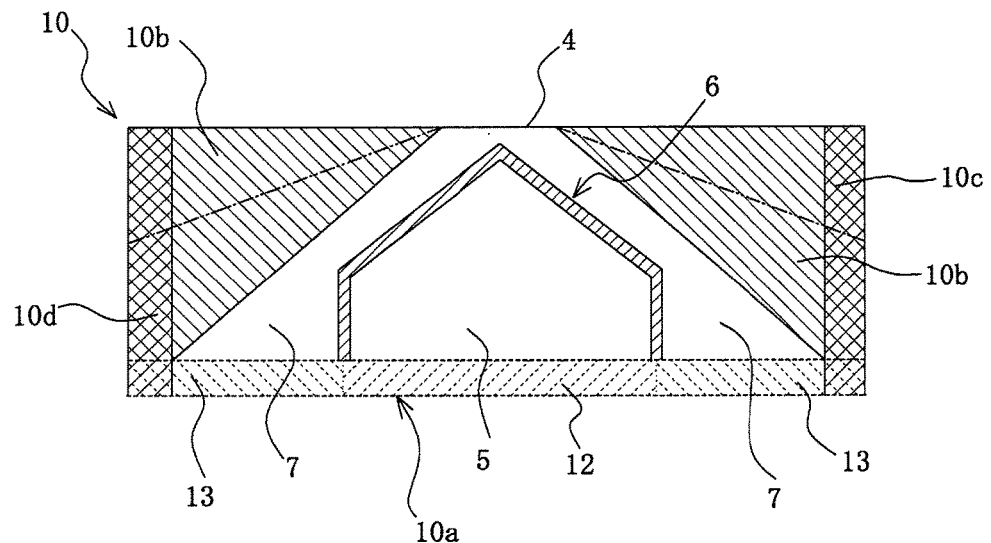
FIG. 3 is an enlarged view of a back-lined portion in another embodiment of the package bag according to the invention.

FIG. 3 is an enlarged view of the back-lined portion 10 when the outer edge seal part 10b is enlarged from a position shown by a phantom line to the package bag 1 of FIG. 1 and the pouring path 7 is made narrow. This pouring path 7 stabilizes the flow of the liquid packing material, so that the pouring directionality of the liquid packing material can be improved to attain accurate pouring to a target position.

Moreover, such an enlarged portion may be gradually peeled as an easy-peelable portion together with the pouring of the liquid packing material. Thus, the pouring path 7 can be gradually enlarged associated with the decrease of the liquid packing material in the filling space 2 to maintain easy pouring of the liquid packing material.

Figure 4:
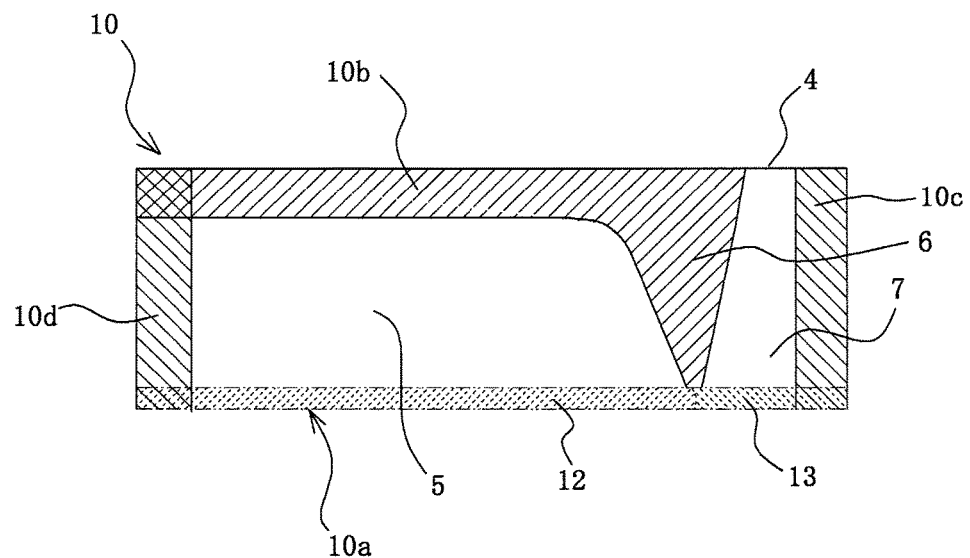
FIG. 4 is an enlarged view of a back-lined portion in the other embodiment of the package bag according to the invention.

Another embodiment of the back-line portion 10 in the package bag according to the invention is shown in FIG. 4.

The back-lined portion 10 in this embodiment of the package bag 1 is formed by superposing both side portions of the packaging laminate film likewise the foregoing embodiment, and peripheral edge thereof is sealed by an inner edge seal part 10a, an outer edge seal part 10b, an upper edge seal part 10c and a lower edge seal part 10d, and a pouring port 4 is provided in the outer edge seal part 10b. Further, the back-lined portion 10 is provided with a partition wall 6 extending between the outer edge seal part 10b and the inner edge seal part 10a connecting them and made of a seal portion formed by heat-sealing front and rear packaging laminate films, and inside of the seal parts 10a-10d is divided into a self-supporting stable portion 5 and a pouring path 7 by the partition wall 6.

In the package bag 1, the self-supporting stable portion 5 is enclosed by the partition wall 6, first easy-peelable portion 12, outer edge seal part 10b and lower edge seal part 10d.

In FIG. 4, the pouring path 7 is disposed in a side portion of the upper edge seal part 10c. However, the pouring path 7 may be disposed in a side portion of the lower edge seal part 10d or may be disposed in a side portion of each of the upper edge seal part 10c and lower edge seal part 10d. In any case, it is preferable to locate at least a part of each of the self-supporting stable portion 5 and first easy-peelable portion 12 in a central part of the back-lined portion 10. This is due to the fact that the central part of the back-lined portion 10 is high in the degree of freedom and is a place most easily peeled by the pressure of the liquid packing material. Thus, the package bag 1 can be opened simply by preferentially peeling the first easy-peelable portion 12 under an action of a small pushing force as compared to the second easy-peelable portion 13.

In such a package bag 1, when the filling space 2 is folded outward into two parts at the back-lined portion 10 as a border and pushed at such a state in a direction of approaching these parts to each other (first pushing) likewise the foregoing embodiment, a portion of the first easy-peelable portion 12 located in a central portion of the inner edge seal part 10a in the longitudinal direction is first peeled and therefore the liquid packing material in the filling space 2 is poured into the self-supporting stable portion 5. The self-supporting stable portion 5 is changed into a swelling state by flowing the liquid packing material from the filling space 2 and becomes a self-supporting state. When the filling space 2 is further pushed at such a self-supporting state (second pushing), the second easy-peelable portion 13 disposed in the pouring path 7 is gradually peeled, the liquid packing material in the self-supporting stable portion 5 and the filling space 2 is slowly introduced into the pouring port 4, whereby the liquid packing material is gently poured from the pouring port 4.

In this embodiment, the partition wall 6 is preferable to be disposed in an upper position (near to the upper edge seal part 10c) and/or a lower position (near to the lower edge seal part 10d) to the central portion of the inner edge seal part 10a in the longitudinal direction. Thus, at least a part of the first easy-peelable portion 12 (self-supporting stable portion 5) is located in the longitudinally central portion of the inner edge seal part 10a, so that the flowing of the liquid packing material into the pouring port 4 at a highest pouring pressure can be prevented effectively at the start of peeling from the central portion of the inner edge seal part 10a.

Also, it is preferable that the partition wall 6 is at least an easy-peelable portion at a boundary position to the inner edge seal part 10a. In this case, the partition wall 6 does not block the movement from the peeling of the first easy-peelable portion 12 to the peeling of the second easy-peelable portion 13, so that the peeling procedure becomes smooth and even the second easy-peelable portion 13 having a low degree of freedom in the opening (peeling) direction can be peeled under an action of a small pushing force.

The pouring path 7 is preferable to be such a tapered form that the width is gradually made narrow toward the pouring port 4 as shown in FIG. 4. In this case, the liquid packing material is flowed into the pouring port 4 along the inclination face of the inclined pouring path 7 (partition wall 6), so that it can be expected to have an effect of easily controlling the pouring amount, pouring pressure and pouring direction of the liquid packing material.

Figure 5:
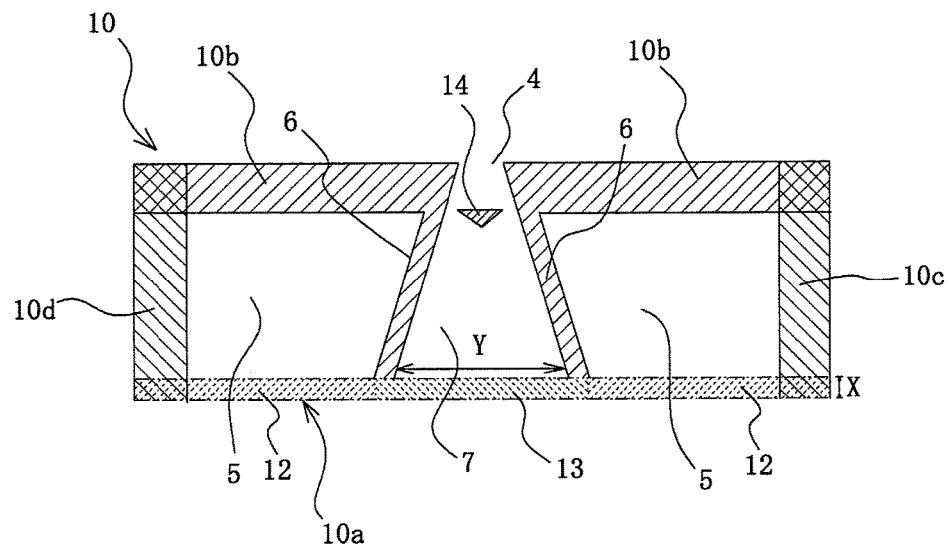
FIG. 5 is an enlarged view of back-lined portion in a further embodiment of the package bag according to the invention, wherein (a) is a case that a pouring path is gradually narrowed toward a pouring port and (b) is a case that a pouring path is gradually widened toward a pouring port.
Figure 5:
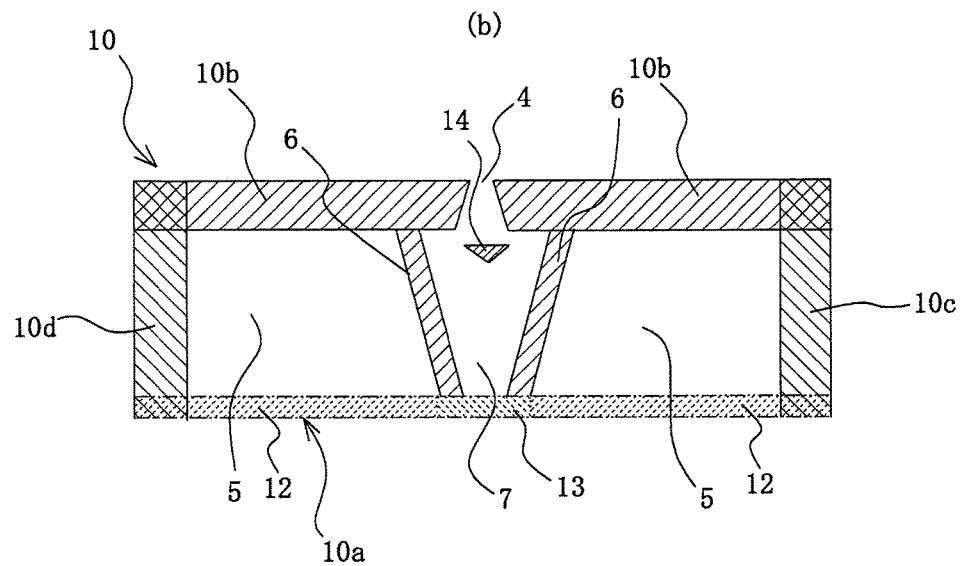

Further, the other embodiment of the back-lined portion 10 in the package bag according to the invention is shown in FIG. 5.

In this embodiment, the back-lined portion 10 is provided with two partition walls 6 each extending between the outer edge seal part 10b and the inner edge seal part 10a and connecting them, and the pouring path 7 is formed in the central part of the back-lined portion 10 between the two partition walls 6, while the self-supporting stable portions 5 are formed at both sides of the pouring path 7. Moreover, a portion of the inner edge seal part 10a between the self-supporting stable portion 5 and the filling space 2 is the first easy-peelable portion 12 and a portion between the pouring path 7 and the filling space 2 is the second easy-peelable portion 13.

Since the central part of the back-lined portion 10 is high in the degree of freedom to the side portion as previously mentioned, when the pressure of the liquid packing material by pushing the filling space 2 is applied to the inner edge seal part 10a, the peeling is started from the central part. Therefore, when the pouring path 7 is disposed in the central part of the back-lined portion 10 as shown in FIG. 5, if joint portions to the first easy-peelable portion 12 and the second easy-peelable portion 13 are equal, the second easy-peelable portion 13 is peeled on ahead, so that the self-supporting effect of the back-lined portion 10 by filling the liquid packing material into the self-supporting stable portion 5 cannot be expected and further there is a fear of directly flowing the liquid packing material into the pouring port 4 to unintentionally pour a great amount of the liquid packing material.

In this embodiment, therefore, the joining strength of the first easy-peelable portion 12 is made lower than the joining strength of the second easy-peelable portion 13, whereby the first easy-peelable portion 12 is opened preferentially. It is preferable that the joining strengths of the first easy-peelable portion 12 and the second easy-peelable portion 13 are properly adjusted by changing sealing conditions such as sealing temperature, sealing pressure and the like to adjust sealing strength, or by adjusting a sealing width (X) or a length (Y) of the second easy-peelable portion 13.

In FIG. 5, the pouring path 7 is arranged in a position near to the upper edge seal part 10c or the lower edge seal part 10d, while the second easy-peelable portion 13 is separated from the central portion of the inner edge seal part 10a (the first easy-peelable portion 12 is located in the central portion of the inner edge seal part 10a), whereby the first easy-peelable portion 12 can be preferentially peeled to the second easy-peelable portion and liquid packing material can be poured from the filling space 2 to the self-supporting stable portion 5.

Even in this case, the package bag 1 is folded outward into two parts at the border of the back-lined portion 10 likewise the forgoing embodiment (see FIG. 1(b)) and the filling space 2 is pushed at such a state in a direction of approaching the two parts to each other as shown by an arrow (first pushing), whereby the first easy-peelable portion 12 having a low joining strength is first peeled and the liquid packing material in the filling space 2 is poured into the self-supporting stable portion 5. When the filling space 2 is further pushing (second pushing), the second easy-peelable portion 13 disposed in the pouring path 7 portion is gradually peeled, while the liquid packing material in the self-supporting stable portion 5 and the filling space 2 is slowly introduced into the pouring port 4, whereby the liquid packing material is gently poured from the pouring port 4.

When the pouring path 7 is gradually made narrow toward the pouring port 4 as shown in FIG. 5(a), the liquid packing material can be poured along the partition wall 6 toward the pouring port 4, so that the pouring directionality can be improved and the occurrence of liquid dropping from the pouring port 4 or the like can be prevented. On the other hand, the pouring path 7 may be gradually widened toward the pouring port 4 as shown in FIG. 5(b). The width of the pouring path 7 is preferable to be determined in accordance with the kind (presence or absence of granular substances) and viscosity of the liquid packing material and so on. For example, when the viscosity of the liquid packing material is high (soy sauce, soup and the like), the width of the pouring path 7 is made narrow to decrease the pouring amount from the filling space 2 to the pouring path 7, whereby stable pouring can be attained.

In FIGS. 5(a) and (b), an island-shaped seal portion 14 for adjusting a path width is disposed in the pouring path 7. The seal portion 14 for adjusting the the path width may be one or more or may be an easy-peelable portion capable of peeling by the pushing of the liquid packing material. Since the path width of the pouring path 7 is locally narrowed by the seal portion 14 for adjusting the path width, the flow rate of the liquid packing material flown in this part is adjusted. For example, even if the viscosity of the liquid packing material is low, the flowing of a great amount of the liquid packing material into the pouring port 4 can be prevented.

DESCRIPTION OF REFERENCE SYMBOLS 1 package bag
2 filling space
2a folded portion
4 pouring port
5 self-supporting stable portion
6 partition wall
6a side portion
7 pouring path
9a top seal part
9b bottom seal part
10 back-lined portion
10a inner edge seal part
10b outer edge seal part
10c upper edge seal part
10d lower edge seal part
12 first easy-peelable portion
13 second easy-peelable portion
14 seal portion for adjusting path width

The invention claimed is:

1. A packaging bag comprising a laminated film, the packaging bag comprising:
　a middle portion formed by overlapping in a butted seam side portions of the laminated film, and a filling space for liquid packing material, the filling space being defined by at least a top seal part and a bottom seal part, wherein a peripheral edge of the middle portion is sealed by an outer edge seal part, an inner edge seal part, an upper edge seal part and a lower edge seal part, while an internal section of the middle portion is divided by a partition wall, into a self-supporting stable portion and a pouring path communicating to a pouring port is provided in the outer edge seal part; and
　the self-supporting stable portion and the pouring path are adjacent to the filling space through the inner edge seal part, the inner edge seal part includes a first peelable portion separating the self-supporting stable portion and the filling space, and a second peelable portion separating the pouring path and the filling space, the first peelable portion and the second peelable portion having a lower joining strength than the joining strength of the outer edge seal part, the upper edge seal part, and the lower edge seal part, and the first peelable portion peels before the second peelable portion by pushing the filling space.

2. The package bag according to claim 1, wherein at least a part of the first peelable portion is located at a central portion of the inner edge seal part.

3. The package bag according to claim 1, wherein a length of the first peelable portion is longer than that of the second peelable portion.

4. The package bag according to claim 1, wherein the self-supporting stable portion is enclosed by the first peelable portion and the partition wall.

5. The package bag according to claim 1, wherein the partition wall is extended between the outer edge seal part and the inner edge seal part and connected thereto.

6. The package bag according to claim 1, wherein the pouring path is located in a central part of the middle portion, while the self-supporting stable portion is located on both sides of the pouring path through the partition wall, and a joining strength of the second peelable portion is higher than a joining strength of the first peelable portion.

7. The package bag according to claim 1, wherein the partition wall is provided on at least a part thereof with a peelable portion.

8. The package bag according to claim 1, wherein the pouring path is gradually narrowed toward the pouring port.

9. The package bag according to claim 1, wherein the filling space is defined by a folded portion of the side portions of the laminate film.

10. The package bag according to claim 1, wherein the pouring path has a seal portion for adjusting a path width.

11. The package bag according to claim 1, wherein the pouring port is sealed on its inner faces at a peelable state.

12. A method for using a package bag as claimed in claim 1, wherein the first peelable portion is peeled by a first pushing to the filling space filled with the liquid packing material to fill the liquid packing material poured through the first peelable portion into the self-supporting stable portion, and then the second peelable portion is peeled by a second pushing to the filling space and the liquid packing material in the self-supporting stable portion and the filling space is guided to the pouring path and poured from the pouring port located at a top thereof.

13. The method for using a package bag according to claim 12, wherein the first and second pushing to the filling space are based on pushing in a thickness direction of the filling space at a state of outward-folding the package bag into two parts at the middle portion as a border.

14. The packaging bag according to claim 2, wherein a length of the first peelable portion is longer than that of the second peelable portion.

15. The packaging bag according to claim 14, wherein the pouring path is gradually narrowed toward the pouring path.

16. The packaging bag according to claim 15, wherein the side portions of the laminate film are folded portions of the laminate film.

17. The packaging bag according to claim 16, wherein the self-supporting stable portion is enclosed by the first peelable portion and the partition wall.

18. The packaging bag according to claim 17, wherein the partition wall is provided on at least a part thereof with a peelable portion.

19. The packaging bag according to claim 16, wherein the partition wall is extended between the outer edge seal part and the inner edge seal part and connected thereto.

20. The packaging bag according to claim 19, wherein the partition wall is provided on at least a part thereof with a peelable portion.

* * * * *